United States Patent
Boehm et al.

(10) Patent No.: US 12,511,378 B2
(45) Date of Patent: Dec. 30, 2025

(54) TEMPERATURE CHANGE MEASUREMENT TO DETECT ATTACK

(71) Applicant: Micron Technology, Inc., Boise, ID (US)

(72) Inventors: Aaron P. Boehm, Boise, ID (US); David Hulton, Seattle, WA (US); Jeremy Chritz, Seattle, WA (US); Tamara Schmitz, Scotts Valley, CA (US); Max S. Vohra, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 271 days.

(21) Appl. No.: 17/659,409

(22) Filed: Apr. 15, 2022

(65) Prior Publication Data

US 2023/0334152 A1    Oct. 19, 2023

(51) Int. Cl.
*G06F 21/55*       (2013.01)
*G01K 1/02*        (2021.01)
*G01K 3/00*        (2006.01)

(52) U.S. Cl.
CPC .......... *G06F 21/554* (2013.01); *G01K 1/026* (2013.01); *G01K 3/005* (2013.01)

(58) Field of Classification Search
CPC ....... G06F 21/554; G01K 1/026; G01K 3/005
See application file for complete search history.

(56) References Cited

U.S. PATENT DOCUMENTS

| | | | |
|---|---|---|---|
| 2013/0138901 A1* | 5/2013 | Cordero | G06F 11/1666 |
| | | | 711/E12.103 |
| 2014/0215613 A1* | 7/2014 | Kelley | G06F 21/86 |
| | | | 726/23 |
| 2016/0239663 A1* | 8/2016 | Healy | G06F 11/076 |
| 2018/0089425 A1* | 3/2018 | Trikalinou | G06F 21/70 |
| 2019/0042802 A1* | 2/2019 | Trikalinou | G06F 21/554 |
| 2020/0257604 A1* | 8/2020 | Roh | G06F 11/3058 |
| 2020/0334171 A1* | 10/2020 | Meier | G06F 21/6218 |
| 2021/0141564 A1* | 5/2021 | Shin | G06F 3/0659 |
| 2021/0311823 A1* | 10/2021 | Schat | G06F 11/1068 |
| 2021/0359505 A1* | 11/2021 | Gupta | H02H 1/0007 |

* cited by examiner

*Primary Examiner* — Tod R Swann
*Assistant Examiner* — Daniel Elahian
(74) *Attorney, Agent, or Firm* — Holland & Hart LLP

(57) ABSTRACT

Methods, systems, and devices for temperature change measurement to detect an attack on a memory device are described. A memory device may measure a rate of change for temperature readings at a dynamic random access memory (DRAM) component of the memory device (e.g., using sensors at the DRAM component). The memory device may compare the rate of change for the temperature to a threshold, for example, using circuitry, a threshold value stored in memory, or both. If the memory device determines that the rate of change for the temperature satisfies the threshold, the memory device may disable one or more features of the memory device to protect against a potential attack. For example, an attack on the memory device may be indicated by the change in temperature readings at the DRAM component, and the memory device may perform one or more protective measures based on detecting the temperature change.

35 Claims, 5 Drawing Sheets

TEMPERATURE CHANGE MEASUREMENT TO DETECT ATTACK

FIELD OF TECHNOLOGY

The following relates to one or more systems for memory, including a system supporting a temperature change measurement to detect an attack.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
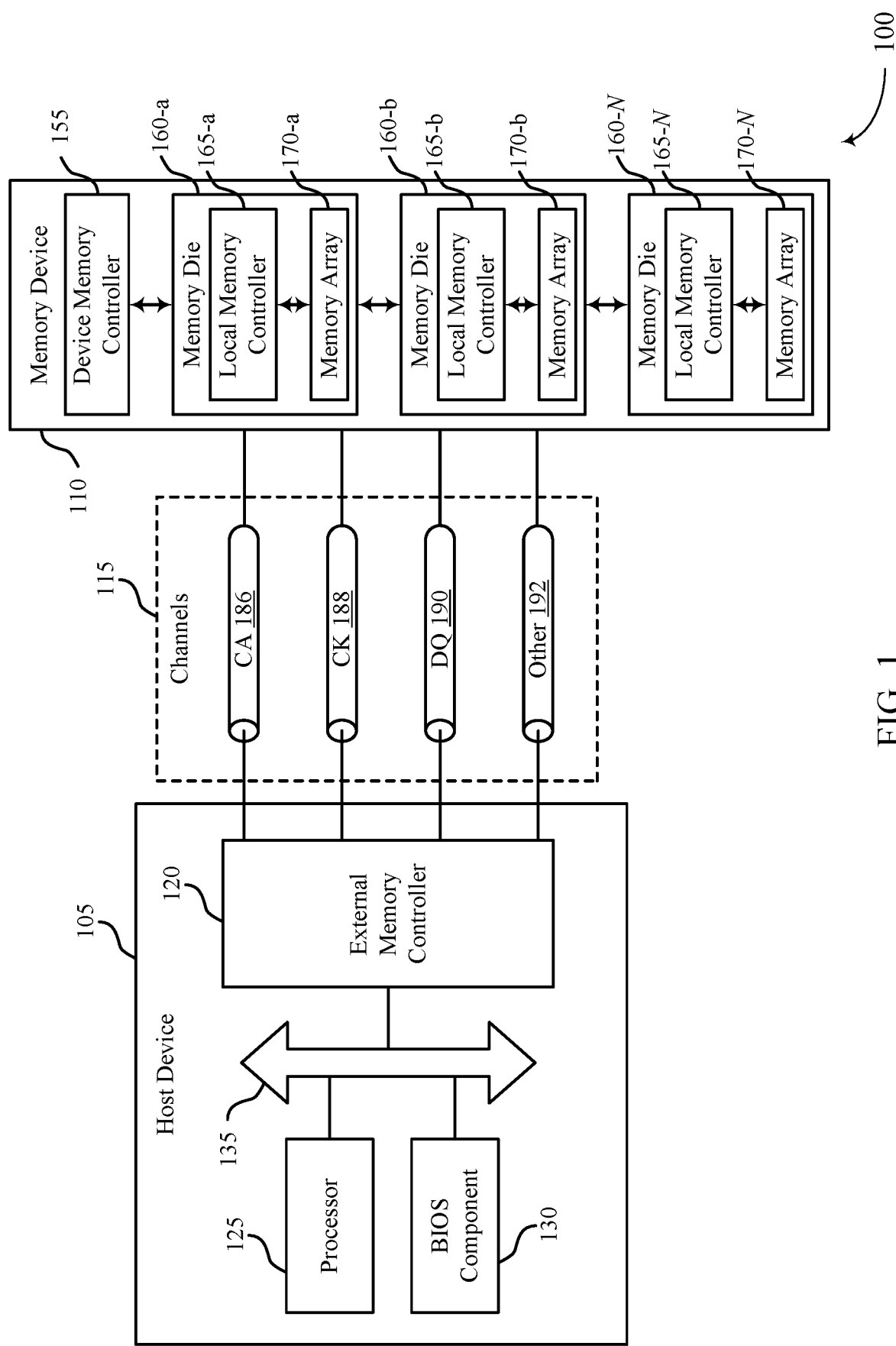
FIGS. 1 and 2 illustrate examples of systems that support temperature change measurement to detect an attack in accordance with examples as disclosed herein.

A system, such as an automotive system (e.g., a vehicle), may include a host device coupled with a memory device. In some examples, an unauthorized user (e.g., a hacker, a customer) may remove the memory device—which may be an example of or include a dynamic random access memory (DRAM) component—from the system or may otherwise modify the memory device to gain access to information stored on or communicated using the memory device. In some examples, an attacker may utilize a freeze spray or another method to super-cool the device, such as the DRAM, and preserve the data in the memory array of the device before removing the device, for example, from a vehicle. For example, the freeze spray may significantly lower the temperature of the DRAM, slowing processing at the DRAM such that the DRAM fails to discharge at least a portion of sensitive data written to the memory array within a threshold time period. In some cases, super-cooling the DRAM may allow the attacker to probe the DRAM and identify information stored in the memory array before the information is discharged or otherwise secured at the DRAM. Detecting such an attack, before the attack occurs or even as the attack occurs, may allow the memory device to perform operations to mitigate the theft of secure or other information and prevent future theft of secure or other information.

As disclosed herein, a rate of change of the temperature experienced by the DRAM during an attack, such as a super-cooling attack, may be used to detect the attack on the DRAM. For example, using a temperature rate of change, rather than absolute temperature measurements, may support more reliable detection of a super-cooling attack because extremely cold temperatures (e.g., temperatures resulting from a super-cooling attack, such as temperatures near negative thirty-two degrees Fahrenheit (−32° F.)) may be within the range of operating temperatures for the memory device. Accordingly, using an absolute temperature threshold to detect a super-cooling attack may either fail to detect the attack (e.g., if the temperature threshold is set to low) or may indicate an attack on the DRAM at operating temperatures for the memory device (e.g., if the temperature threshold is set to high), for example, at very cold ambient temperatures. In contrast, as described herein, a memory device may use a temperature rate of change of a component, such as the DRAM, to detect a super-cooling attack. The rate of change for the temperature of the component, such as the DRAM, may change significantly during a super-cooling attack, as compared to during normal operating conditions. In some cases, the memory device may include sensors that may detect a temperature rate of change. For example, temperature sensors on the DRAM may be used to determine whether the rate of change of temperature satisfies (e.g., is greater than) a threshold rate of change (e.g., 1 degree Celsius per millisecond (1° C./ms), or some other threshold rate of change). If a sensor detects a rate of change that satisfies the threshold, the memory device may determine that the DRAM has been affected by super-cooling and may trigger corrective action at the memory device. For example, the memory device may notify a host device of the attack, and the host device may disable one or more features of the memory device based on or in response to the detected temperature rate of change. Additionally or alternatively, the memory device may automatically trigger discharging at least a subset of information (e.g., sensitive information, encryption keys) from the DRAM in response to detecting the super-cooling attack. By taking corrective action, such as disabling one or more features, the memory device may effectively lock or limit specific functionality or some information to protect secure information against attack.

Features of the disclosure are initially described in the context of systems as described with reference to FIGS. 1 and 2. Additional features of the disclosure are described in the context of a flow diagram as described with reference to FIG. 3. These and other features of the disclosure are further illustrated by and described with reference to an apparatus diagram and flowcharts that relate to temperature change measurement to detect an attack as described with reference to FIGS. 4 and 5.

FIG. 1 illustrates an example of a system 100 that supports temperature change measurement to detect an attack in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

In some examples, the system 100 or the host device 105 may include an input component, an output component, or both. An input component may represent a device or signal external to the system 100 that provides information (e.g., signals, data) to the system 100 or its components. In some examples, an input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, CK channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110 or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, DQ channels 190 may be operable to communicate information (e.g., data, control information) between the host device 105 and the memory device 110.

For example, the DQ channels 190 may communicate information (e.g., bi-directionally) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of an M-ary modulation scheme where M is equal to two. A symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and others.

In some examples, a multi-symbol (or multi-level) modulation scheme may be used to modulate signals communicated between the host device 105 and the memory device 110. A multi-symbol modulation scheme may be an example of an M-ary modulation scheme where M is greater than or equal to three. A symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some examples, the system 100 may be an example of an automotive system (e.g., a vehicle). For example, the host device 105 and the memory device 110 may both be components of a vehicle, and the host device 105, the memory device 110, or both may be further coupled with other components of the vehicle. In some cases, a system 100 may be susceptible to attacks from hackers or other users. For example, a user (e.g., a hacker) may probe a memory device 110, such as a DRAM bus or another type of memory device or component, to determine information from the memory device 110. In this way, the user may gain access to secure information or components (e.g., firmware, keys, plaintext data) of the memory device 110 that is intended to be hidden from or inaccessible to the user. Secure information may be information stored at a device (e.g., a vehicle) or information communicated in an ecosystem (e.g., between the vehicle and other devices or cloud components). In some cases, a user may manipulate information at the vehicle or communication information to trigger specific responses, access specific data, or cause other responses at the memory device 110. Secure information may be especially susceptible while a memory device 110 is in an idle state (e.g., operating in a relatively low power mode), which may occur in some vehicle situations, such as when the vehicle is idle for a given duration. Some memory devices 110, such as low-power double data rate (LPDDR) DRAM memory devices, may remain in an idle state for significant periods of time (e.g., days, weeks), during which a user (e.g., a hacker) may attempt to retrieve information (e.g., information that should be otherwise restricted from the user) from the memory device 110. Some vehicle systems may utilize LPDDR DRAM memory for improved power efficiency, but the LPDDR DRAM memory may be potentially susceptible to attacks while the vehicle is parked.

A user (e.g., a hacker) may perform one or more different types of attacks to try to access secure information at a memory device 110. In a first example, the user may physically remove the memory device 110 or a portion of the memory device 110 from the system 100 (e.g., from the vehicle). For example, while the vehicle is turned off and the memory device 110 is in an idle state, the user may remove the memory device 110 and probe the memory device 110 for information (e.g., by detecting information on a DRAM or bus, by putting the memory device 110 into a reader to read out information, or using some other technique). In some cases, the user may remove the DRAM component (e.g., from or as part of a PCB) at the memory device 110, may install an interposer with a breakout cable, and may capture DRAM traffic using a protocol analyzer. In some other cases, the user may freeze the DRAM, other memory device components, or both (e.g., using a substance to super-cool the memory device 110 relatively quickly), then remove the cooled memory device 110, and probe the removed memory device 110. For example, the user may remove the DRAM ball grid array (BGA) component from the PCB, solder down the DRAM socket, and install a different DRAM in the socket. This different DRAM may be programmed with data during operation of the vehicle. After the memory device enters a lower power mode such as a sleep mode (e.g., persisting data in RAM), the user may super-cool the DRAM (e.g., with freeze spray) and remove the cooled DRAM. Supercooling the DRAM may cause the array to retain at least some data without performing a refresh operation for a significant period of time. The user may place the removed DRAM in another socket board that may be unlocked or have additional test equipment to read the contents of the array, searching for keys to decrypt the secure storage. The user may capture a significant quantity of information (e.g., terabytes of data) over a period of time (e.g., one or more days) while the memory device 110 is removed using one or more of these techniques.

As described herein, if a memory device 110 or a portion of a memory device 110 is super-cooled and removed from the system 100, the rate of change of temperature may be different than that of normal operating conditions. Accordingly, the system 100 may detect an attack on the memory device 110 based on detecting a rate of change of temperature that satisfies a threshold (e.g. a temperature rate of change outside normal operating conditions). In some cases, during production or before leaving an original equipment manufacturer (OEM), a reference value may be determined for the rate of change of temperature threshold. To support detection of an attack, the memory device 110 may detect a rate of change of temperature and compare the detected rate of change of temperature to the rate of change of temperature threshold. In some cases, a rate of change of temperature that satisfies the threshold (e.g., is greater than the threshold) may indicate that there is or has been an attack on the memory device 110. As such, the memory device 110 may take corrective action, such as notifying the host device 105, disabling one or more features (e.g., lock specific functionality to protect secure information against attack) at the memory device 110, or any combination thereof in response to the memory device 110 detecting a rate of change of temperature satisfying the threshold.

Though some examples may be described herein in terms of DRAM, ferroelectric RAM (FeRAM), or other capacitive-based memory types, it is to be understood that aspects of the teachings herein may be applied to any memory device (e.g., various types and combinations of volatile memory, non-volatile memory, or some combinations of both). Additionally, although some examples may be described herein in terms of vehicles and automotive systems, it is to be understood that the teachings herein may be applied to any system and various examples outside of the vehicle context, which is merely one example implementation.

Figure 2:
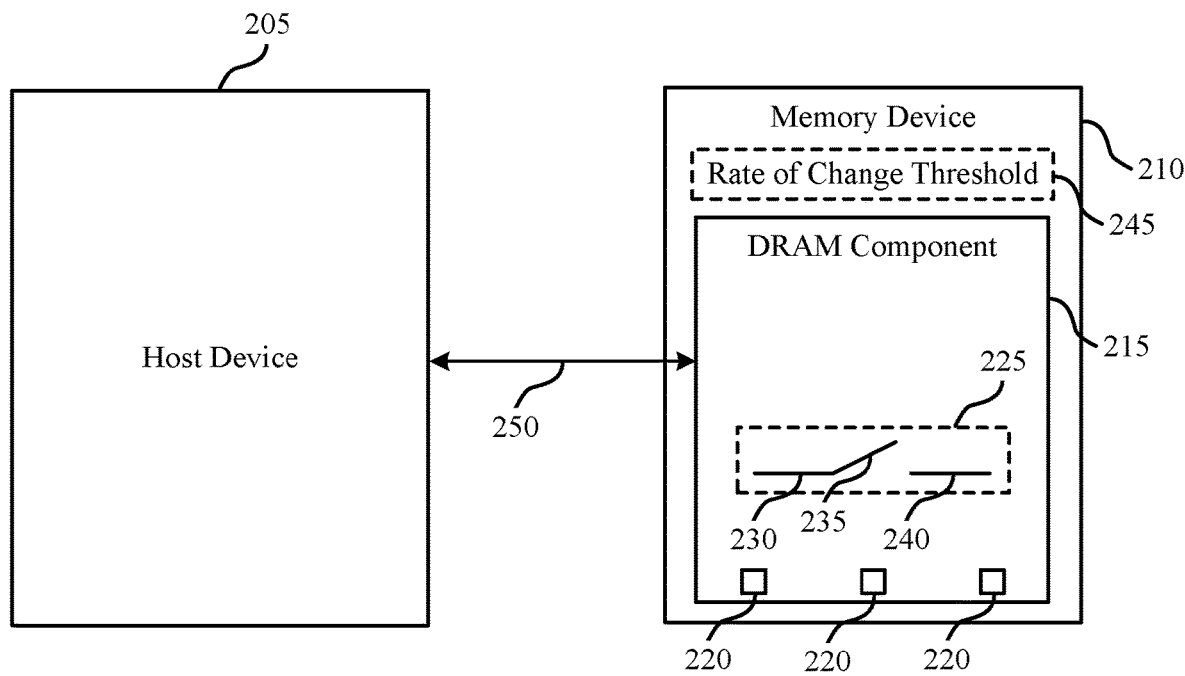

FIG. 2 illustrates an example of a system 200 that supports temperature change measurement to detect an attack in accordance with examples as disclosed herein. The system 200 may be an example of a system 100 as described with reference to FIG. 1. For example, the system 200 may be an example of an automotive system, such as a vehicle. The system 200 may include a host device 205 and a memory device 210, which may be examples of the corresponding devices described with reference to FIG. 1. The host device 205 may be coupled with the memory device 210, such that the host device 205 may issue signals to and receive signals from the memory device 210 over one or more channels 250, such as the channels 115 described with reference to FIG. 1. In some cases, the memory device 210 may include a DRAM component 215 in communication with the host device 205. The memory device 210 may monitor a rate of change of temperature of the DRAM component 215 (or relatively near to the DRAM component 215) to detect attacks on the memory device 210 (e.g., attacks on the DRAM component 215).

The memory device 210 may use one or more sensors 220 located at the DRAM component 215 to measure the temperature of the DRAM component 215. Additionally or alternatively, the memory device 210 may use sensors 220 located at other portions of the memory device 210, sensors 220 that are parts of external components or devices to the memory device 210, or some combination thereof to measure temperature readings in relatively close proximity to the DRAM component 215 to detect temperature changes at the DRAM component 215. The sensors 220 may be configured to detect an attack based on temperature readings or may send temperature readings to one or more other components of the DRAM component 215 or the memory device 210 to detect the attack. In some examples, the sensors 220 may be configured or otherwise designed to measure temperature readings for use in attack detection. In some other examples, the sensors 220 may also be used to measure temperature readings for other purposes (e.g., tracking data refresh rate).

In some examples, based on temperatures measured by one or more sensors 220, the memory device 210 may detect a rate of change of temperature and may determine whether there is an attack on the DRAM component 215 based on whether the rate of change of temperature satisfies a threshold. In some cases, the memory device 210 may use a logic-based method for determining there is an attack. For example, the memory device 210 may calculate a temperature rate of change value (e.g., using multiple temperature measurements and corresponding timestamps) and may compare the temperature rate of change value to a threshold value (e.g., a rate of change threshold 245 stored at the memory device 210, the DRAM component 215, or both). If the detected rate of change of temperature satisfies the threshold (e.g., is greater than the threshold), the memory device 210 may determine there is an attack. That is, super-cooling the DRAM component 215 may cause the temperature measured by a sensor 220 to change at a rate that is greater than the threshold value. In another example, if the detected rate of change of temperature does not satisfy the threshold, the memory device 210 may determine there is not an attack on the DRAM component 215 (e.g., the DRAM component 215 was not super-cooled as part of an attack).

In some other cases, the memory device 210 may use a circuit 225 at the DRAM component 215—or elsewhere at the memory device 210—to determine if there is an attack. For example, the circuit 225 may include an input signal 230, a latch 235, and an output signal 240. The input signal 230 may be based on the rate of change of temperature. That is, the input signal 230 may indicate the rate of change of temperature measured by one or more sensors 220. In some examples, the voltage level of the input signal 230 may indicate the value of the rate of change of temperature. If the input signal 230 reaches a threshold (e.g., the voltage level of the input signal 230 meets or exceeds a threshold voltage level), the latch 235 may switch (e.g., close), which may cause a detectable output signal 240 from the circuit 225. This output signal 240 may trigger one or more processes at the DRAM component 215, the memory device 210, or both. For example, if the memory device 210 is able to detect the output signal 240 from the circuit 225, the memory device 210 may determine that there is an attack on the DRAM component 215.

If the memory device 210 detects there is an attack on the DRAM component 215, the memory device 210 may perform one or more operations. In some cases, the memory device 210 may transmit, via a channel 250, a signal including otherwise indicating a notification indicating to the host device 205 that the rate of change of temperature satisfies the threshold. In some such cases, the memory device 210 may receive signaling from the host device 205 in response to this notification (e.g., including or otherwise indicating instructions to perform one or more protective actions). For example, the memory device 210 may disable one or more features based on the signaling received from the host device 205. Additionally or alternatively, the memory device 210 may disable one or more features of the memory device 210, the DRAM component 215, or both in response to detecting the attack on the DRAM component 215 (e.g., in response to the output signal 240 from the circuit 225 based on the latch 235 flipping, in response to the temperature rate of change satisfying the rate of change threshold 245).

In some cases, disabling one or more features may include locking execution of one or more access commands for the memory device 210. For example, if the memory device 210 receives an access command from the host device 205 after locking execution of one or more access commands, the memory device 210 may refrain from executing the access command. In this way, the memory device 210 may disable access to data or other information at the DRAM component 215, protecting against an attacker accessing data or other information at the DRAM component 215. Additionally or alternatively, the memory device 210 may lock execute of access commands corresponding to specific portions of the DRAM component 215 (e.g., portions configured for storing sensitive information).

Additionally or alternatively, the memory device 210 may discharge a portion of an array of memory cells of the DRAM component 215. For example, discharging a portion of the array of memory cells of the DRAM component 215 may include writing one or more values of zero to one or more capacitive storage elements of the array of memory cells. The discharged portion of the array of memory cells of the DRAM component 215 may be discharged because it contains data associated with a security parameter. That is, the DRAM component 215 may be configured to store sensitive information in the portion of the array of memory cells associated with the security parameter and may discharge this portion storing sensitive information. For example, the portion of the array may include a specific section of a bank, a specific address space, or any other portion of the memory array at the DRAM component 215. Additionally or alternatively, the memory device 210 may discharge the entire array of memory cells of the DRAM component 215 in response to detecting the attack on the DRAM component 215.

In some cases, disabling one or more features may include removing one or more keys from non-volatile memory at the memory device 210. For example, the one or more keys may include encryption keys used to decrypt information at the DRAM component 215. Deleting the keys may effectively revoke access to the corresponding data that can be decrypted using the keys. In some cases, disabling one or more features of the memory device 210 may include any combination of transmitting a notification to the host device 205, locking execution of one or more access commands, discharging at least a portion of the array of memory cells of the DRAM component 215, removing one or more keys from the memory of the memory device 210, and any other protective actions supported by the memory device 210.

The host device 205 may configure the memory device 210 through signaling. For example, the host device 205 may configure the rate of change of temperature threshold, the protective actions the memory device 210 may execute if the memory device 210 determines there is an attack, or both. Alternatively, the rate of change of temperature threshold, the protective actions, or both may be pre-configured at the memory device 210 (e.g., at initial setup of the memory device 210). In some cases, the rate of change threshold 245 for temperature may be stored in a non-volatile memory location at the memory device 210 (e.g., written to non-volatile memory at a memory device controller, written to non-volatile memory at the DRAM component 215, programmed to a fuse).

In some examples, the memory device 210 may perform a granular process for detecting attack. For example, the memory device 210 may trigger a first operation if the rate of change of temperatures satisfies the threshold (e.g., a first threshold), and the memory device 210 may trigger a second operation if the rate of change of temperature satisfies another threshold (e.g., a second threshold). For example, based on the rate of change of temperature satisfying the first threshold, the memory device 210 may flag the host device 205 or disable one or more features, and if the rate of change of temperature satisfies the second threshold, the memory device 210 may disable additional features (e.g., discharging one or more portions of the DRAM component 215). Additionally or alternatively, the memory device 210 may trigger an operation (e.g., flagging the host device 205 or disabling one or more features) if the rate of change of temperature satisfies the threshold (e.g., a first threshold) and the temperature at the DRAM component 215 satisfies a threshold (e.g., a second threshold). In some examples, the second threshold may be an absolute temperature corresponding to normal operating conditions. The memory device 210 may trigger a second operation (e.g., disabling one or more additional features) if the temperature at the DRAM component 215 satisfies another threshold (e.g., a third threshold) in addition to the rate of change of temperature satisfying the threshold. That is, as the temperature approaches the super-cooled temperature for the DRAM component 215, the memory device 210 may perform progressively more protective actions. In some cases, the second operation may be or include a more severe protective action than the first operation (e.g., the first operation may be flagging the host device 205 or locking execution of access commands, while the second operation may be discharging one or more portions of the DRAM component 215).

Figure 3:
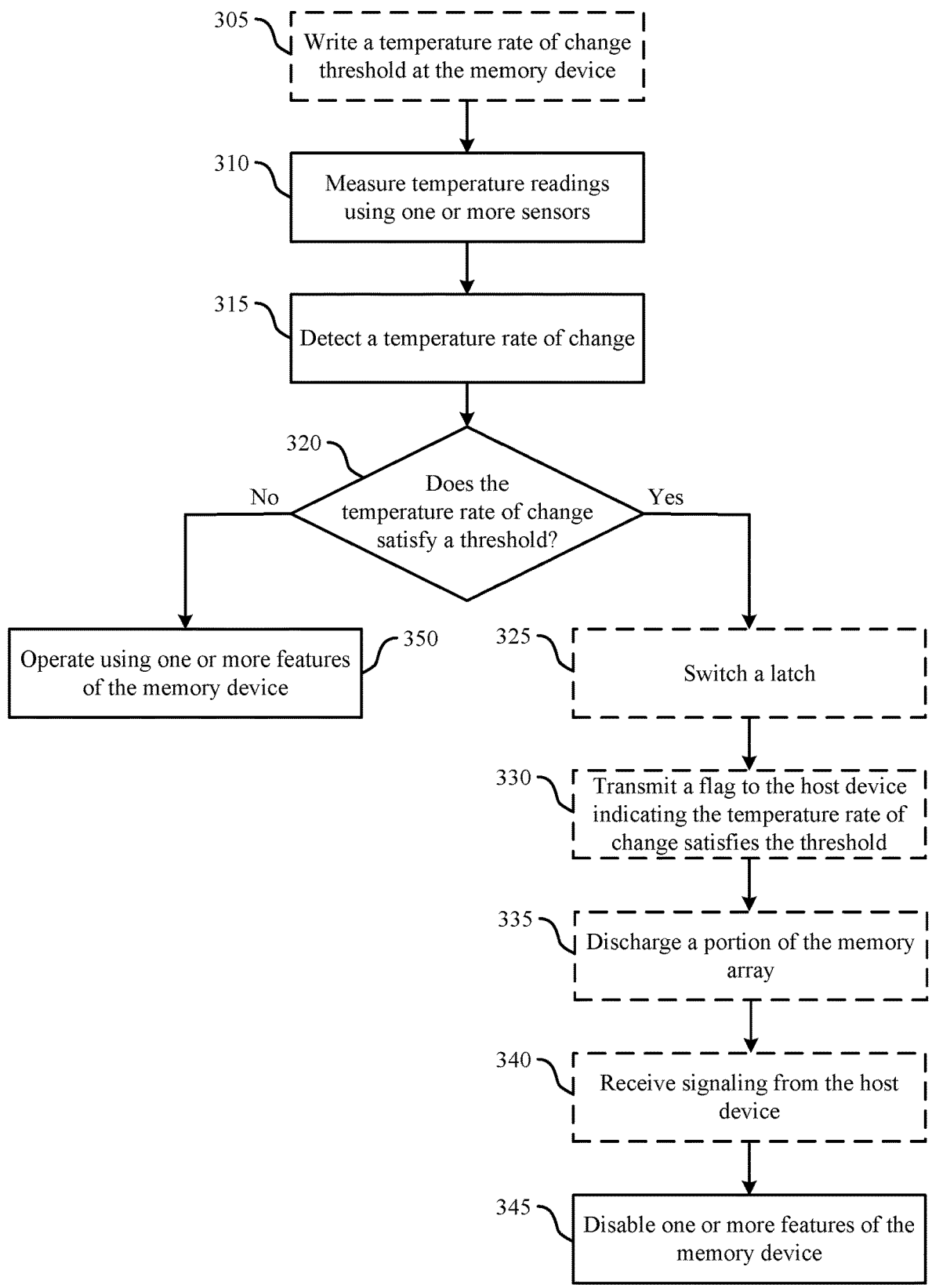
FIG. 3 illustrates an example of a process flow that supports temperature change measurement to detect an attack in accordance with examples as disclosed herein.

FIG. 3 illustrates an example of a process flow 300 that supports temperature change measurement to detect an attack in accordance with examples as disclosed herein. The process flow 300 may be performed by devices described with reference to FIGS. 1 and 2. For example, a memory device—such as a memory device 110 or a memory device 210—may perform the operations described with reference to the process flow 300. Alternatively, a host device—such as a host device 105 or a host device 205—may perform one or more aspects of the process flow 300, and a memory device—such as a memory device 110 or a memory device 210—may perform one or more of the aspects of the process flow 300. The host device may be coupled with the memory device, and the host device and memory device may both be associated with (e.g., components of) a vehicle. The process flow 300 may support detection of a memory device attack based on temperature change measurements of a DRAM component, such as the DRAM component 215 described with reference to FIG. 2. Alternative examples of the following may be implemented, where some steps are performed in a different order or not at all. Additionally, some steps may include additional features not mentioned below.

Aspects of the process flow 300 may be implemented by a controller, among other components (e.g., a host device controller, an external memory controller, a memory device controller, or some combination thereof). Additionally or alternatively, aspects of the process flow 300 may be implemented by logic coupled with a host device or a memory device. For example, the logic may be operable to cause an apparatus to perform the operations of the process flow 300.

At 305, the memory device may write a rate of change of temperature threshold to memory. For example, the rate of change of temperature threshold may be stored in non-volatile memory at the memory device, as described with reference to FIG. 2. In some cases, the memory device may program the threshold to a fuse of the memory device, or the fuse may otherwise be configured to store the threshold. In some cases, at 305, the host device may transmit, to the memory device, signaling which indicates a configuration for disabling features of the memory device if the memory device determines that there is an attack, as described with reference to FIG. 2. The memory device may store information relating to the configuration in memory.

At 310, the memory device may measure temperature readings at a DRAM component of the memory device using one or more sensors as described with reference to FIG. 2. At 315, the memory device may detect a rate of change of temperature based on the measurements taken at the one or more sensors. For example, the memory device may determine a temperature rate of change using successive temperature readings by a sensor and timestamps for the successive temperature readings (e.g., or a periodicity between temperature readings). Additionally or alternatively, the memory device may average a temperature across multiple sensors and use the average temperature to determine a temperature rate of change for the memory device. In some examples, the memory device may remove one or more outlier temperature readings to avoid false detections of attacks. In some examples, the memory device may use an average temperature reading for a first time period and an average temperature reading for a second time period to calculate the temperature rate of change. Such time periods may be relatively short (e.g., on the scale of milliseconds) to ensure the memory device may detect a super-cooling attack on the DRAM component before information is compromised.

At 320, the memory device may determine if the rate of change of temperature satisfies a threshold (e.g., a first threshold stored in non-volatile memory at the memory device). For example, the rate of change of temperature may be greater than the threshold, and the memory device may determine that the rate of change of temperature satisfies the threshold. In some cases, if the rate of change of temperature satisfies the threshold, the memory device may perform one or more of the following operations. The host device may indicate the rate of change threshold through signaling, or the manufacturer may program the threshold during production. The memory device may use a single threshold or may use multiple thresholds (e.g., for granular protective actions). In some cases, a measured rate of change of temperature may be due to typical operating conditions, while in other cases the measured rate of change of temperature may be due to super-cooling spray used by an attacker in an attempt to remove the DRAM component of the memory device. The threshold value may be configured such that typical operating conditions fail to trigger protective actions, while an attack using super-cooling spray triggers the protective actions according to the threshold value.

In some examples, at 320, the memory device may determine that the temperature rate of change for the DRAM component satisfies the threshold. In some cases, at 325, as described with reference to FIG. 2, an input signal (e.g., a first signal) based the rate of change of temperature may switch a latch, causing an output signal (e.g., a second signal) which indicates that the rate of change of temperature satisfies the threshold. In some cases, the output signal may indicate to the memory device that there may be an attack and the memory device may disable one or more features. For example, the output signal may be sent to one or more components of the memory device and may trigger the disabling of the one or more features.

In some cases, at 330, the memory device may transmit a flag to the host device indicating that the rate of change of temperature satisfies the threshold, as described with reference to FIG. 2. The flag may alert the host device that there may be an attack on the DRAM component. For example, the memory device may send a signal indicative of the flag to the host device.

In some cases, at 335, the memory device may discharge a portion of the array of memory cells at the DRAM component, as described with reference to FIG. 2. For example, the discharged portion of the array of memory cells may contain data associated with a security parameter (e.g., secure information, sensitive information). Discharging a portion of the array of memory cells may include writing one or more values of zero (e.g., or another default value, or a random value) to one or more capacitive storage elements of the memory cells.

In some cases, at 340, the memory device may receive signaling from the host device, as described with reference to FIG. 2. For example, the signaling from the host device may include instructions for disabling one or more features. The memory device may also receive signaling from the host device that indicates a temperature reading (e.g., a first temperature reading) at the host device. In some cases, the memory device may compare the temperature reading at the host device to a temperature reading at the DRAM component (e.g., a second temperature reading). Based on the comparison, at 345, the memory device may disable one or more features. For example, if a difference between the temperature reading at the host device and the temperature reading at the DRAM component satisfies a threshold, the memory device may determine that there may be an attack on the DRAM component (e.g., an attacker is applying super-cooling spray to the DRAM component in order to remove it, while the host device is not experiencing a similar temperature), and the memory device may disable one or more features.

At 345, the memory device may disable one or more features of the memory device, as described with reference to FIG. 2. The aspects of 345 may include any combination of the aspects of 330, 335, 340, or any other protective actions performed by the memory device or DRAM component in response to detecting the attack on the DRAM component.

At 350, if at 320 the memory device determines that the rate of change of temperature does not satisfy the threshold, the memory device may operate using one or more features of the memory device (e.g., normal operations). That is, if the temperature rate of change does not indicate a super-cooling attack on the DRAM component, the memory device may operate according to normal operating parameters.

Figure 4:
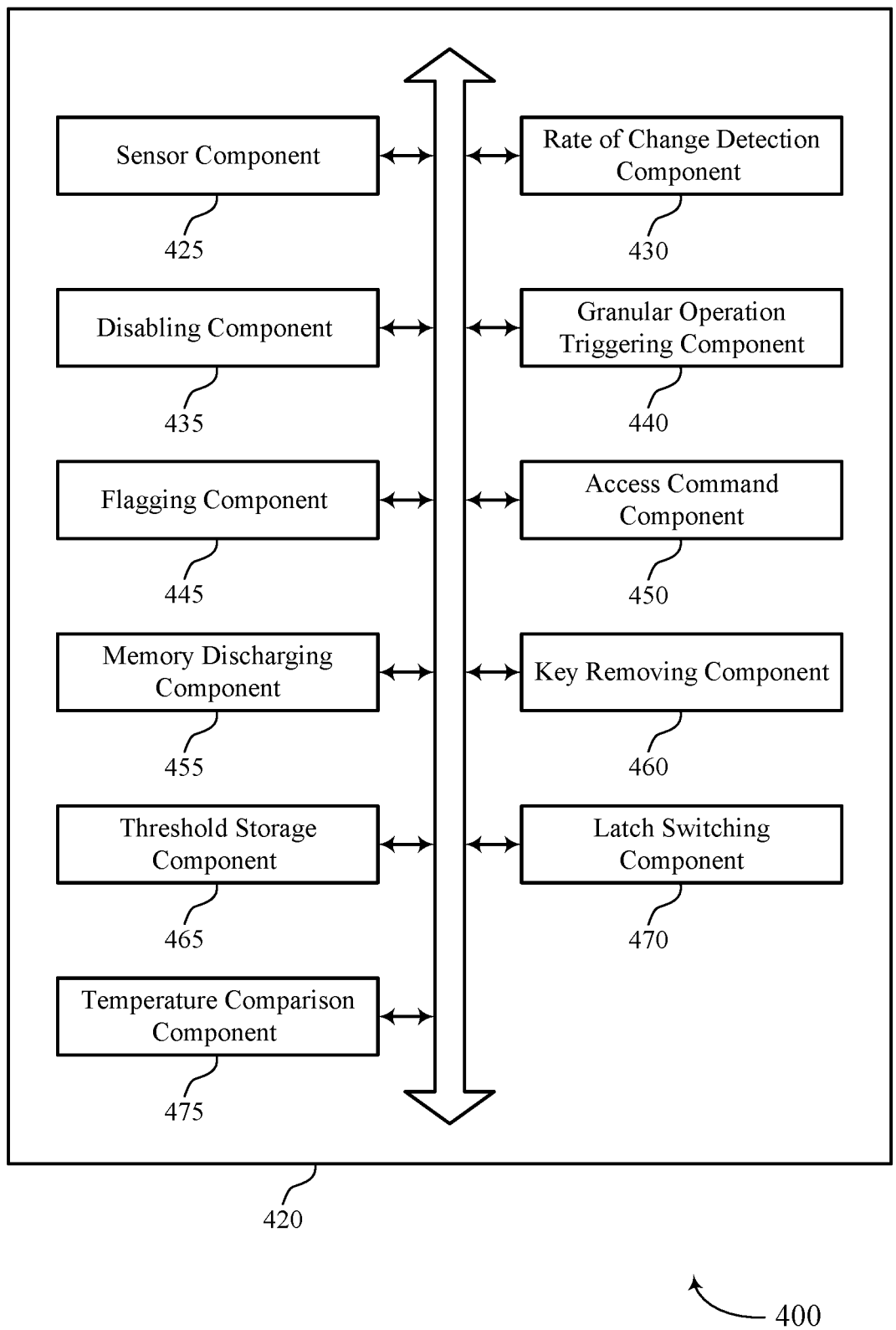
FIG. 4 shows a block diagram of a memory device that supports temperature change measurement to detect an attack in accordance with examples as disclosed herein.

FIG. 4 shows a block diagram 400 of a memory device 420 that supports temperature change measurement to detect an attack in accordance with examples as disclosed herein. The memory device 420 may be an example of aspects of a memory device as described with reference to FIGS. 1 through 3. The memory device 420, or various components thereof, may be an example of means for performing various aspects of temperature change measurement to detect an attack as described herein. For example, the memory device 420 may include a sensor component 425, a rate of change detection component 430, a disabling component 435, a granular operation triggering component 440, a flagging component 445, an access command component 450, a memory discharging component 455, a key removing component 460, a threshold storage component 465, a latch switching component 470, a temperature comparison component 475, or any combination thereof. Each of these components may communicate, directly or indirectly, with one another (e.g., via one or more buses).

The sensor component 425 may be configured as or otherwise support a means for measuring a plurality of temperature readings using one or more sensors associated with a DRAM component of a memory device. The rate of change detection component 430 may be configured as or otherwise support a means for detecting, at the memory device, a rate of change for a temperature at the DRAM component based at least in part on the plurality of temperature readings. The disabling component 435 may be configured as or otherwise support a means for disabling one or more features of the memory device based at least in part on the rate of change for the temperature satisfying a first threshold.

In some examples, the one or more sensors are located at the DRAM component and are configured to detect an attack on the memory device based at least in part on the plurality of temperature readings. In some examples, disabling the one or more features of the memory device is based at least in part on detecting the attack on the memory device.

In some examples, the granular operation triggering component 440 may be configured as or otherwise support a means for triggering a first operation based at least in part on the temperature at the DRAM component satisfying a second threshold at a first time and the rate of change for the temperature satisfying the first threshold. In some examples, the granular operation triggering component 440 may be configured as or otherwise support a means for triggering a second operation based at least in part on the temperature at the DRAM component satisfying a third threshold at a second time and the rate of change for the temperature satisfying the first threshold, where disabling the one or more features of the memory device is based at least in part on the first operation, or the second operation, or both.

In some examples, the granular operation triggering component 440 may be configured as or otherwise support a means for triggering a first operation based at least in part on the rate of change for the temperature satisfying the first threshold. In some examples, the granular operation triggering component 440 may be configured as or otherwise support a means for triggering a second operation based at least in part on the rate of change for the temperature satisfying a second threshold, where disabling the one or more features of the memory device is based at least in part on the first operation, or the second operation, or both.

In some examples, the disabling component 435 may be configured as or otherwise support a means for receiving, from a host device, signaling indicative of a configuration for disabling features of the memory device, where disabling the one or more features of the memory device is based at least in part on the configuration.

In some examples, the flagging component 445 may be configured as or otherwise support a means for transmitting, to a host device, signaling indicative of a flag indicating that the rate of change for the temperature satisfies the first threshold.

In some examples, the access command component 450 may be configured as or otherwise support a means for receiving, from a host device, signaling indicative of an access command. In some examples, the access command component 450 may be configured as or otherwise support a means for refraining from executing the access command based at least in part on disabling the one or more features of the memory device.

In some examples, the memory discharging component 455 may be configured as or otherwise support a means for discharging at least a portion of an array of memory cells of the DRAM component based at least in part on disabling the one or more features of the memory device.

In some examples, the memory discharging component 455 may be configured as or otherwise support a means for writing data to the portion of the array of memory cells of the DRAM component based at least in part on the data being associated with a security parameter, where discharging at least the portion of the array of memory cells of the DRAM component is based at least in part on writing the data associated with the security parameter to the portion of the array of memory cells of the DRAM component.

In some examples, the memory discharging component 455 may be configured as or otherwise support a means for writing one or more values of zero to one or more capacitive storage elements of the array of memory cells of the DRAM component based at least in part on disabling the one or more features of the memory device, where discharging at least the portion of the array of memory cells of the DRAM component is based at least in part on writing the one or more values of zero.

In some examples, the key removing component 460 may be configured as or otherwise support a means for removing one or more keys from non-volatile memory at the memory device based at least in part on disabling the one or more features of the memory device.

In some examples, the temperature at the DRAM component satisfies a second threshold corresponding to an absolute temperature reading and indicating normal operating conditions.

In some examples, the threshold storage component 465 may be configured as or otherwise support a means for programming the first threshold to a fuse of the memory device, where the rate of change for the temperature is compared with the first threshold programmed to the fuse of the memory device.

In some examples, the threshold storage component 465 may be configured as or otherwise support a means for writing the first threshold to non-volatile memory at the memory device, where the rate of change for the temperature is compared with the first threshold written to the non-volatile memory at the memory device.

In some examples, the latch switching component 470 may be configured as or otherwise support a means for switching a latch in response to the rate of change for the temperature satisfying the first threshold, where disabling the one or more features of the memory device is based at least in part on switching the latch.

In some examples, the temperature comparison component 475 may be configured as or otherwise support a means for receiving, from a host device, signaling indicative of a first temperature reading at the host device. In some examples, the temperature comparison component 475 may be configured as or otherwise support a means for comparing the first temperature reading at the host device to a second temperature reading at the DRAM component, where disabling the one or more features of the memory device is further based at least in part on comparing the first temperature reading at the host device to the second temperature reading at the DRAM component.

Figure 5:
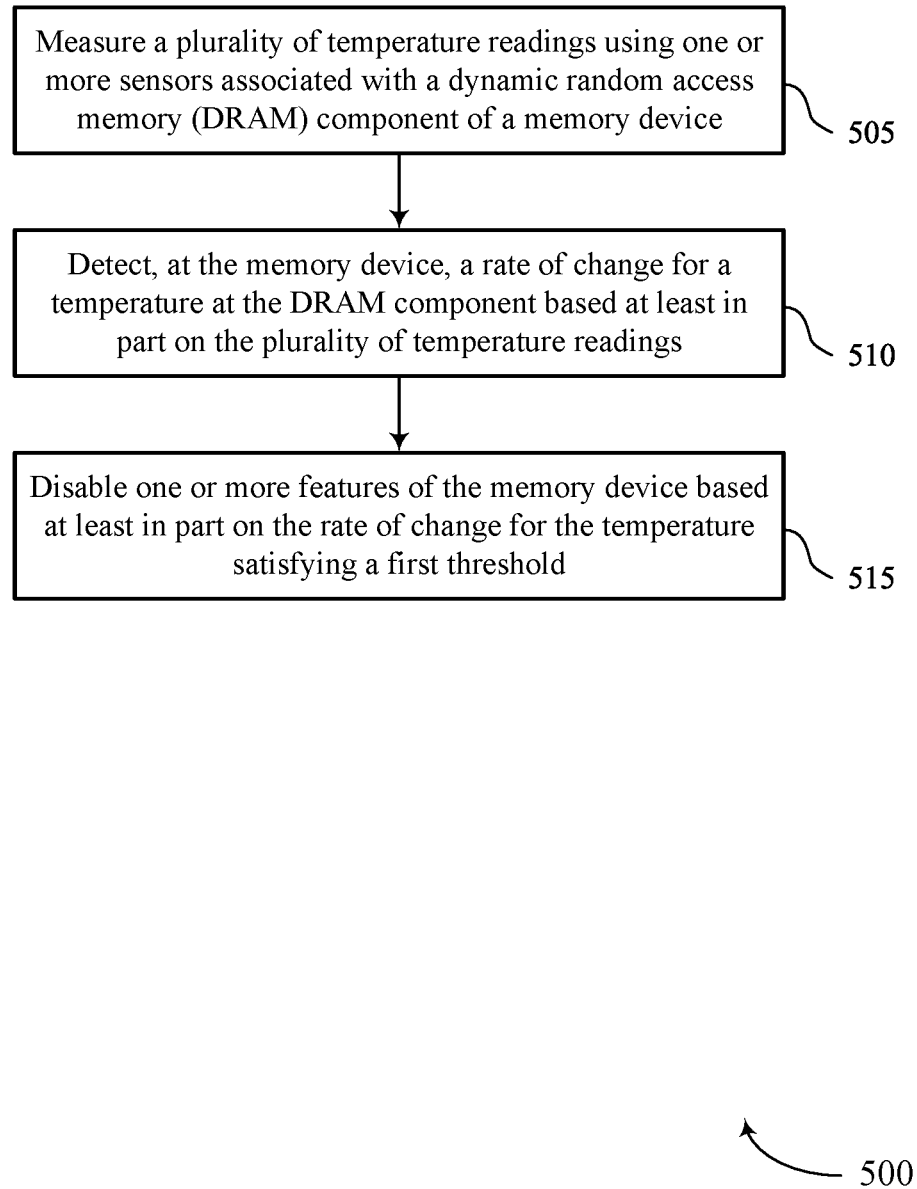
FIG. 5 shows a flowchart illustrating a method or methods that support temperature change measurement to detect an attack in accordance with examples as disclosed herein.

FIG. 5 shows a flowchart illustrating a method 500 that supports temperature change measurement to detect an attack in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally or alternatively, the memory device may perform aspects of the described functions using special-purpose hardware.

At 505, the method may include measuring a plurality of temperature readings using one or more sensors associated with a DRAM component of a memory device. The operations of 505 may be performed in accordance with examples as disclosed herein. In some examples, aspects of the operations of 505 may be performed by a sensor component 425 as described with reference to FIG. 4.

At 510, the method may include detecting, at the memory device, a rate of change for a temperature at the DRAM component based at least in part on the plurality of temperature readings. The operations of 510 may be performed in accordance with examples as disclosed herein. In some examples, aspects of the operations of 510 may be performed by a rate of change detection component 430 as described with reference to FIG. 4.

At 515, the method may include disabling one or more features of the memory device based at least in part on the rate of change for the temperature satisfying a first threshold. The operations of 515 may be performed in accordance with examples as disclosed herein. In some examples, aspects of the operations of 515 may be performed by a disabling component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for measuring a plurality of temperature readings using one or more sensors associated with a DRAM component of a memory device; detecting, at the memory device, a rate of change for a temperature at the DRAM component based at least in part on the plurality of temperature readings; and disabling one or more features of the memory device based at least in part on the rate of change for the temperature satisfying a first threshold.

Aspect 2: The method, apparatus, or non-transitory computer-readable medium of aspect 1 where the one or more sensors are located at the DRAM component and are configured to detect an attack on the memory device based at least in part on the plurality of temperature readings, and where disabling the one or more features of the memory device is based at least in part on detecting the attack on the memory device.

Aspect 3: The method, apparatus, or non-transitory computer-readable medium of any of aspects 1 through 2, further including operations, features, circuitry, logic, means, or instructions, or any combination thereof for triggering a first operation based at least in part on the temperature at the DRAM component satisfying a second threshold at a first time and the rate of change for the temperature satisfying the first threshold and triggering a second operation based at least in part on the temperature at the DRAM component satisfying a third threshold at a second time and the rate of change for the temperature satisfying the first threshold, where disabling the one or more features of the memory device is based at least in part on the first operation, or the second operation, or both.

Aspect 4: The method, apparatus, or non-transitory computer-readable medium of any of aspects 1 through 3, further including operations, features, circuitry, logic, means, or instructions, or any combination thereof for triggering a first operation based at least in part on the rate of change for the temperature satisfying the first threshold and triggering a second operation based at least in part on the rate of change for the temperature satisfying a second threshold, where disabling the one or more features of the memory device is based at least in part on the first operation, or the second operation, or both.

Aspect 5: The method, apparatus, or non-transitory computer-readable medium of any of aspects 1 through 4, further including operations, features, circuitry, logic, means, or instructions, or any combination thereof for receiving, from a host device, signaling indicative of a configuration for disabling features of the memory device, where disabling the one or more features of the memory device is based at least in part on the configuration.

Aspect 6: The method, apparatus, or non-transitory computer-readable medium of any of aspects 1 through 5, further including operations, features, circuitry, logic, means, or instructions, or any combination thereof for transmitting, to a host device, signaling indicative of a flag indicating that the rate of change for the temperature satisfies the first threshold.

Aspect 7: The method, apparatus, or non-transitory computer-readable medium of any of aspects 1 through 6, further including operations, features, circuitry, logic, means, or instructions, or any combination thereof for receiving, from a host device, signaling indicative of an access command and refraining from executing the access command based at least in part on disabling the one or more features of the memory device.

Aspect 8: The method, apparatus, or non-transitory computer-readable medium of any of aspects 1 through 7, further including operations, features, circuitry, logic, means, or instructions, or any combination thereof for discharging at least a portion of an array of memory cells of the DRAM component based at least in part on disabling the one or more features of the memory device.

Aspect 9: The method, apparatus, or non-transitory computer-readable medium of aspect 8, further including operations, features, circuitry, logic, means, or instructions, or any combination thereof for writing data to the portion of the array of memory cells of the DRAM component based at least in part on the data being associated with a security parameter, where discharging at least the portion of the array of memory cells of the DRAM component is based at least in part on writing the data associated with the security parameter to the portion of the array of memory cells of the DRAM component.

Aspect 10: The method, apparatus, or non-transitory computer-readable medium of aspect 8, further including operations, features, circuitry, logic, means, or instructions, or any combination thereof for writing one or more values of zero to one or more capacitive storage elements of the array of memory cells of the DRAM component based at least in part on disabling the one or more features of the memory device, where discharging at least the portion of the array of memory cells of the DRAM component is based at least in part on writing the one or more values of zero.

Aspect 11: The method, apparatus, or non-transitory computer-readable medium of any of aspects 1 through 10, further including operations, features, circuitry, logic, means, or instructions, or any combination thereof for removing one or more keys from non-volatile memory at the memory device based at least in part on disabling the one or more features of the memory device.

Aspect 12: The method, apparatus, or non-transitory computer-readable medium of any of aspects 1 through 11 where the temperature at the DRAM component satisfies a second threshold corresponding to an absolute temperature reading and indicating normal operating conditions.

Aspect 13: The method, apparatus, or non-transitory computer-readable medium of any of aspects 1 through 12, further including operations, features, circuitry, logic, means, or instructions, or any combination thereof for programming the first threshold to a fuse of the memory device, where the rate of change for the temperature is compared with the first threshold programmed to the fuse of the memory device.

Aspect 14: The method, apparatus, or non-transitory computer-readable medium of any of aspects 1 through 12, further including operations, features, circuitry, logic, means, or instructions, or any combination thereof for writing the first threshold to non-volatile memory at the memory device, where the rate of change for the temperature is compared with the first threshold written to the non-volatile memory at the memory device.

Aspect 15: The method, apparatus, or non-transitory computer-readable medium of any of aspects 1 through 14, further including operations, features, circuitry, logic, means, or instructions, or any combination thereof for switching a latch in response to the rate of change for the temperature satisfying the first threshold, where disabling the one or more features of the memory device is based at least in part on switching the latch.

Aspect 16: The method, apparatus, or non-transitory computer-readable medium of any of aspects 1 through 15, further including operations, features, circuitry, logic, means, or instructions, or any combination thereof for receiving, from a host device, signaling indicative of a first temperature reading at the host device and comparing the first temperature reading at the host device to a second temperature reading at the DRAM component, where disabling the one or more features of the memory device is further based at least in part on comparing the first temperature reading at the host device to the second temperature reading at the DRAM component.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 17: An apparatus, including: an array of memory cells that each include capacitive storage elements; a sensor configured to measure a plurality of temperature readings for the array of memory cells; and logic coupled with the sensor and operable to cause the apparatus to: determine a rate of change for a temperature of the array of memory cells using one or more of the plurality of temperature readings from the sensor; and perform an operation at the apparatus in response to the rate of change for the temperature satisfying a threshold.

Aspect 18: The apparatus of aspect 17, where the operation includes transmitting signaling indicative of a notification to a host device indicating that the rate of change for the temperature satisfies the threshold, locking execution of one or more access commands on the array of memory cells, or discharging at least a portion of the array of memory cells, or any combination thereof.

Aspect 19: The apparatus of any of aspects 17 through 18, further including: a fuse configured to store the threshold, where the logic is further operable to cause the apparatus to: determine that the rate of change for the temperature of the array of memory cells satisfies the threshold based at least in part on the fuse being configured to store the threshold.

Another apparatus is described. The following provides an overview of aspects of the apparatus as described herein:

Aspect 20: An apparatus, including: an array of memory cells that each include capacitive storage elements; a sensor configured to measure a rate of change for a temperature of the array of memory cells; and circuitry coupled with the sensor and operable to: receive first signaling indicative of the rate of change for the temperature; switch a latch of the circuitry in response to the rate of change for the temperature satisfying a threshold; and transmit second signaling indicative of a command to disable one or more features of the array of memory cells in response to switching the latch.

Aspect 21: The apparatus of aspect 20, further including: a fuse configured to store the threshold, where the circuitry is operable to: determine that the rate of change for the temperature of the array of memory cells satisfies the threshold based at least in part on the fuse being configured to store the threshold.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
measuring a plurality of temperature readings using one or more sensors associated with a dynamic random access memory (DRAM) component of a memory device;
detecting, at the memory device, a rate of change for a temperature of the DRAM component based at least in part on the plurality of temperature readings;
receiving, at the memory device and from a host device, signaling indicative of a first temperature reading of the host device;
comparing, at the memory device, the first temperature reading of the host device to a second temperature reading of the DRAM component; and
disabling one or more features of the memory device based at least in part on the rate of change for the temperature satisfying a first threshold and further based at least in part on a difference between temperature readings satisfying a second threshold, the difference being between the first temperature reading of the host device and the second temperature reading of the DRAM component, wherein disabling the one or more features comprises locking execution of one or more access commands on an array of memory cells of the DRAM component.

2. The method of claim 1, wherein the one or more sensors are located at the DRAM component and are configured to detect an attack on the memory device based at least in part on the plurality of temperature readings, and wherein disabling the one or more features of the memory device is based at least in part on detecting the attack on the memory device.

3. The method of claim 1, further comprising:
triggering a first operation based at least in part on the temperature of the DRAM component satisfying a third threshold at a first time and the rate of change for the temperature satisfying the first threshold; and
triggering a second operation based at least in part on the temperature of the DRAM component satisfying a fourth threshold at a second time and the rate of change for the temperature satisfying the first threshold, wherein disabling the one or more features of the memory device is based at least in part on the first operation, or the second operation, or both.

4. The method of claim 1, further comprising:
triggering a first operation based at least in part on the rate of change for the temperature satisfying the first threshold; and
triggering a second operation based at least in part on the rate of change for the temperature satisfying a third threshold, wherein disabling the one or more features of the memory device is based at least in part on the first operation, or the second operation, or both.

5. The method of claim 1, further comprising:
receiving, from the host device, signaling indicative of a configuration for disabling features of the memory device, wherein disabling the one or more features of the memory device is based at least in part on the configuration.

6. The method of claim 1, further comprising:
transmitting, to the host device, signaling indicative of a flag indicating that the rate of change for the temperature satisfies the first threshold.

7. The method of claim 1, further comprising:
receiving, from the host device, signaling indicative of an access command; and
refraining from executing the access command based at least in part on the locking execution of one or more access commands.

8. The method of claim 1, further comprising:
discharging at least a portion of the array of memory cells of the DRAM component based at least in part on disabling the one or more features of the memory device.

9. The method of claim 8, further comprising:
writing data to the portion of the array of memory cells of the DRAM component based at least in part on the data being associated with a security parameter, wherein discharging at least the portion of the array of memory cells of the DRAM component is based at least in part on writing the data associated with the security parameter to the portion of the array of memory cells of the DRAM component.

10. The method of claim 8, further comprising:
writing one or more values of zero to one or more capacitive storage elements of the array of memory cells of the DRAM component based at least in part on disabling the one or more features of the memory device, wherein discharging at least the portion of the array of memory cells of the DRAM component is based at least in part on writing the one or more values of zero.

11. The method of claim 1, further comprising:
removing one or more keys from non-volatile memory at the memory device based at least in part on disabling the one or more features of the memory device.

12. The method of claim 1, wherein the temperature of the DRAM component satisfies a third threshold corresponding to an absolute temperature reading and indicating normal operating conditions.

13. The method of claim 1, further comprising:
programming the first threshold to a fuse of the memory device, wherein the rate of change for the temperature is compared with the first threshold programmed to the fuse of the memory device.

14. The method of claim 1, further comprising:
writing the first threshold to non-volatile memory at the memory device, wherein the rate of change for the temperature is compared with the first threshold written to the non- volatile memory at the memory device.

15. The method of claim 1, further comprising:
switching a latch in response to the rate of change for the temperature satisfying the first threshold, wherein disabling the one or more features of the memory device is based at least in part on switching the latch.

16. A system, comprising:
an array of memory cells that each comprise capacitive storage elements;
a sensor configured to measure a plurality of temperature readings for the array of memory cells; and
processing circuitry coupled with the sensor and configured to cause the system to:
determine a rate of change for a temperature of the array of memory cells using one or more of the plurality of temperature readings from the sensor;
receive, at the system and from a host device, signaling indicative of a first temperature reading of the host device;

compare, at the system, the first temperature reading of the host device to a second temperature reading of the system; and perform an operation at the system in response to the rate of change for the temperature satisfying a first threshold and further based at least in part on a difference between temperature readings satisfying a second threshold, the difference being between the first temperature reading of the host device and the second temperature reading of the system, wherein the operation comprises locking execution of one or more access commands on the array of memory cells.

17. The system of claim 16, wherein the operation further comprises transmitting signaling indicative of a notification to the host device indicating that the rate of change for the temperature satisfies the first threshold, or discharging at least a portion of the array of memory cells, or both.

18. The system of claim 16, further comprising:
a fuse configured to store the first threshold, wherein the processing circuitry is further configured to cause the system to:
determine that the rate of change for the temperature of the array of memory cells satisfies the first threshold based at least in part on the fuse being configured to store the first threshold.

19. A system, comprising:
an array of memory cells that each comprise capacitive storage elements;
a sensor configured to measure a rate of change for a temperature of the array of memory cells; and
circuitry coupled with the sensor and configured to cause the system to:
receive first signaling indicative of the rate of change for the temperature;
receive, at the system and from a host device, second signaling indicative of a first temperature reading of the host device;
compare, at the system, the first temperature reading of the host device to a second temperature reading of the system;
switch a latch of the circuitry in response to the rate of change for the temperature satisfying a first threshold and further based at least in part on a difference between temperature readings satisfying a second threshold, the difference being between the first temperature reading of the host device and the second temperature reading of the system; and
transmit third signaling indicative of a command to disable one or more features of the array of memory cells in response to switching the latch, wherein the command to disable the one or more features of the array of memory cells is configured to lock execution of one or more access commands on the array of memory cells.

20. The system of claim 19, further comprising:
a fuse configured to store the first threshold, wherein the circuitry is configured to:
determine that the rate of change for the temperature of the array of memory cells satisfies the first threshold based at least in part on the fuse being configured to store the first threshold.

21. A system, comprising:
one or more memory devices; and
processing circuitry coupled with the one or more memory devices and configured to cause the system to:

measure a plurality of temperature readings using one or more sensors associated with a dynamic random access memory (DRAM) component of a memory device of the one or more memory devices;
detect a rate of change for a temperature of the DRAM component based at least in part on the plurality of temperature readings;
receive, at the system and from a host device, signaling indicative of a first temperature reading of the host device;
compare, at the system, the first temperature reading of the host device to a second temperature reading of the DRAM component; and
disable one or more features of the memory device based at least in part on the rate of change for the temperature satisfying a first threshold and further based at least in part on a difference between temperature readings satisfying a second threshold, the difference being between the first temperature reading of the host device and the second temperature reading of the DRAM component, wherein disabling the one or more features comprises locking execution of one or more access commands on an array of memory cells of the DRAM component.

22. The system of claim 21, wherein the one or more sensors are located at the DRAM component and are configured to detect an attack on the memory device based at least in part on the plurality of temperature readings, and wherein disabling the one or more features of the memory device is based at least in part on detecting the attack on the memory device.

23. The system of claim 21, wherein the processing circuitry is further configured to cause the system to:
trigger a first operation based at least in part on the temperature of the DRAM component satisfying a third threshold at a first time and the rate of change for the temperature satisfying the first threshold; and
trigger a second operation based at least in part on the temperature of the DRAM component satisfying a fourth threshold at a second time and the rate of change for the temperature satisfying the first threshold, wherein disabling the one or more features of the memory device is based at least in part on the first operation, or the second operation, or both.

24. The system of claim 21, wherein the processing circuitry is further configured to cause the system to:
trigger a first operation based at least in part on the rate of change for the temperature satisfying the first threshold; and
trigger a second operation based at least in part on the rate of change for the temperature satisfying a third threshold, wherein disabling the one or more features of the memory device is based at least in part on the first operation, or the second operation, or both.

25. The system of claim 21, wherein the processing circuitry is further configured to cause the system to:
receive, from the host device, signaling indicative of a configuration for disabling features of the memory device, wherein disabling the one or more features of the memory device is based at least in part on the configuration.

26. The system of claim 21, wherein the processing circuitry is further configured to cause the system to:
transmit, to the host device, signaling indicative of a flag indicating that the rate of change for the temperature satisfies the first threshold.

27. The system of claim 21, wherein the processing circuitry is further configured to cause the system to:
  receive, from the host device, signaling indicative of an access command; and
  refrain from executing the access command based at least in part on the locking execution of one or more access commands.

28. The system of claim 21, wherein the processing circuitry is further configured to cause the system to:
  discharge at least a portion of the array of memory cells of the DRAM component based at least in part on disabling the one or more features of the memory device.

29. The system of claim 28, wherein the processing circuitry is further configured to cause the system to:
  write data to the portion of the array of memory cells of the DRAM component based at least in part on the data being associated with a security parameter, wherein discharging at least the portion of the array of memory cells of the DRAM component is based at least in part on writing the data associated with the security parameter to the portion of the array of memory cells of the DRAM component.

30. The system of claim 28, wherein the processing circuitry is further configured to cause the system to:
  write one or more values of zero to one or more capacitive storage elements of the array of memory cells of the DRAM component based at least in part on disabling the one or more features of the memory device, wherein discharging at least the portion of the array of memory cells of the DRAM component is based at least in part on writing the one or more values of zero.

31. The system of claim 21, wherein the processing circuitry is further configured to cause the system to:
  remove one or more keys from non-volatile memory at the memory device based at least in part on disabling the one or more features of the memory device.

32. The system of claim 21, wherein the processing circuitry is further configured to cause the system to:
  program the first threshold to a fuse of the memory device, wherein the rate of change for the temperature is compared with the first threshold programmed to the fuse of the memory device.

33. The system of claim 21, wherein the processing circuitry is further configured to cause the system to:
  write the first threshold to non-volatile memory at the memory device, wherein the rate of change for the temperature is compared with the first threshold written to the non-volatile memory at the memory device.

34. A non-transitory computer-readable medium storing code comprising instructions which, when executed by processing circuitry of an electronic device, cause the electronic device to:
  measure a plurality of temperature readings using one or more sensors associated with a dynamic random access memory (DRAM) component of a memory device;
  detect, at the memory device, a rate of change for a temperature of the DRAM component based at least in part on the plurality of temperature readings;
  receive, at the electronic device and from a host device, signaling indicative of a first temperature reading of the host device;
  compare, at the electronic device, the first temperature reading of the host device to a second temperature reading of the DRAM component; and
  disable one or more features of the memory device based at least in part on the rate of change for the temperature satisfying a first threshold and further based at least in part on a difference between temperature readings satisfying a second threshold, the difference being between the first temperature reading of the host device and the second temperature reading of the DRAM component, wherein disabling the one or more features comprises locking execution of one or more access commands on an array of memory cells of the DRAM component.

35. The method of claim 1, further comprising:
  detecting an attack on the memory device based at least in part on the rate of change for the temperature satisfying the first threshold and further based at least in part on the difference between the first temperature reading of the host device and the second temperature reading of the DRAM component satisfying the second threshold, wherein determining that the difference satisfies the second threshold is based at least in part on comparing the first temperature reading to the second temperature reading, and wherein disabling the one or more features of the memory device is based at least in part on detecting the attack on the memory device.

* * * * *